US005969348A

United States Patent [19]

Franzen

[11] Patent Number: 5,969,348

[45] Date of Patent: Oct. 19, 1999

[54] WIDE MASS RANGE FOCUSING IN TIME-OF-FLIGHT MASS SPECTROMETERS

[75] Inventor: Jochen Franzen, Bremen, Germany

[73] Assignee: Bruker Daltonik GmbH, Bremen, Germany

[21] Appl. No.: 08/933,862

[22] Filed: Sep. 19, 1997

[30] Foreign Application Priority Data

Sep. 20, 1996 [DE] Germany ........................... 196 38 577

[51] Int. Cl.$^{6}$ ............................. B01D 59/44; H21J 49/00

[52] U.S. Cl. ............................................ 250/282; 250/287

[58] Field of Search ...................................... 250/282, 287

[56] References Cited

U.S. PATENT DOCUMENTS

| | | | |
|---|---|---|---|
| 4,458,149 | 7/1984 | Muga | 250/287 |
| 5,504,326 | 4/1996 | Reilly et al. | 250/282 |
| 5,627,369 | 5/1997 | Vestal et al. | 250/287 |
| 5,654,545 | 8/1997 | Holle et al. | 250/287 |
| 5,742,049 | 4/1998 | Holle et al. | 250/287 |

FOREIGN PATENT DOCUMENTS

| | | |
|---|---|---|
| 2308492 | 6/1997 | Russian Federation . |
| 2025821 | 12/1994 | United Kingdom . |

*Primary Examiner*—Bruce C. Anderson

[57] ABSTRACT

The invention relates to measurement methods for time-of-flight mass spectrometers which operate with an ionization of analyte substances adsorbed at the surface of a sample support and an improvement in mass resolution through delayed ion acceleration (or "delayed extraction") in front of the sample support. It particularly relates to velocity focusing for good mass resolution simultaneously for wide ranges of masses within the spectrum.

The invention consists of focusing the flight-times of the ions simultaneously for all masses in wide ranges of interest relative to their initial velocity, by allowing the acceleration in the first accelerating region to increase in time after being switched on. Thus a good resolution cannot only be set for one mass on the spectrum but for all masses in wide ranges simultaneously. In computer simulations, provided there is a correlation of space and velocity distribution, focusing of a least first order is obtained simultaneously for all ions.

13 Claims, 8 Drawing Sheets

WIDE MASS RANGE FOCUSING IN TIME-OF-FLIGHT MASS SPECTROMETERS

FIELD OF THE INVENTION

The invention relates to measurement methods for time-of-flight mass spectrometers which operate with an ionization of analyte substances adsorbed at the surface of a sample support and an improvement in mass resolution through delayed ion acceleration (or "delayed extraction") in front of the sample support. It particularly relates to velocity focusing for good mass resolution simultaneously for wide ranges of masses within the spectrum.

PRIOR ART

In two recently submitted patent applications, BFA 45/96 and BFA 47/96, the disclosures of which are to be included here by reference, conditions for operating methods and geometric arrangements are indicated which lead to very high mass resolution in linear time-of-flight mass spectrometers with desorptive ionization. In patent application BFA 45/96, it is shown that the accelerating voltage of the first accelerating region has to to drop in time for this purpose right after switching on the acceleration. Both a linear drop as well as an exponential drop lead to success. In patent application BFA 47/96, it is shown that high resolution can be generated by geometric design of a linear time-of-flight mass spectrometer, although—apart from the voltage switching for the method of delayed acceleration—no voltages are temporally variied.

In both methods, however, the extremely high mass resolution is only obtained for one single mass in the spectrum at a time. The best focus is adjustable to any mass in the spectrum. Thus one obtains a kind of "magnifying glass" for the isotope pattern of a single molecule group. The mass resolution drops extremely quickly towards smaller or larger masses. At a distance of only about 50 mass units, the isotopic pattern can no longer be resolved. Further away even much poorer resolution is found than could be achieved with the normal method of delayed acceleration described below. If spectra of substances with unknown molecular weights or unknown fragmentation schemes are to be measured, this spectrum acquisition method is highly unsatisfactory, time-consuming and wastes substances excessively.

Among the methods for ionization of macromolecular substances on a sample support, matrix assisted desorption by laser flash "MALDI=matrix assisted desorption and ionization" has found the widest acceptance. The processes of ionization are described in detail in the above quoted patent applications.

After leaving the surface, the ions generally have a substantial average velocity which is for the most part equal for ions of all masses and a strong spread around the average velocity. If no excellent time focusing of the ions is achieved in regard to their initial velocities, the spread leads to a poor resolution when measuring the signals of the individual ion masses. In addition, ionization does not only happen at the time of the laser flash, but also later in the expanding vapor cloud.

However, a method has been known for quite some time for refocusing the ions in spite of their velocity spread and their delayed ionization. This refocusing of ions works by a delayed acceleration in the first acceleration region in front of the sample support plate, at least for ions of one mass. This method is based on the fact that, for all desorption methods, a correlation exists between the space and velocity distribution if the ions are first allowed to spread out in a drift region. For normal linear time-of-flight mass spectrometers (including all of those commercially available), first order focusing thereby results at one point of the spectrum. A similar behavior is found for all types of ionization of substances which are applied to a surface. Examples of this are secondary ion mass spectrometry (SIMS), normal laser desorption (LD) or the so-called plasma desorption (PD) which is obtained by high-energy nuclear fission products penetrating thin films.

However, the well-known method of focusing by delayed acceleration (also known under the name "delayed extraction") which does not offer such extremely high resolutions as the "magnifying glass" method, also does have satisfying resolution in a small part of the total mass spectrum only. Here too the resolution is completely unsatisfactory in other ranges of the mass scale, even if not as bad as with the above described "magnifying glass" method for the mass resolution. Delayed acceleration can therefore only be used advantageously if a value for the masses of the ions to be determined already can be expected. It also not favorable to first make sample scans of the spectrum since the very unfocused signals possess a very bad signal-to-noise ratio, and thus require a high consumption of substance in order to be visible at all.

An ion source for delayed acceleration has at least one intermediate electrode designed as a diaphragm between the sample support and base electrode. The base electrode is at the potential of the field-free flight path. The ion is therefore operated with at least two accelerating voltages, of which the first is applied between the sample support and the first intermediate electrode, and the last between the intermediate electrode and base electrode. Normally only one intermediate electrode is used, which is why there are then two accelerating voltages.

The ions are normally accelerated in the ion source within the two subsequent electrical fields to total energies of around 5 to 30 keV, then shot into the field-free flight path of the mass spectrometer and detected as a time-variable ion current with high time-resolution at the end of the flight path. The first electrical acceleration field is switched on with a delay and serves the above described focusing. From the detected flight time of the ions, their mass-to-charge ratio can be determined. Since the type of ionization can practically only supply singly charged ions, the following discusssion will simply use the term "mass determination" and not the more correct term "determination of mass-to-charge ratios".

Flight times are converted into ion masses by a calibration curve which can be stored in the memory of the data processing system in table form as a sequence of value pairs, flight times and ion masses, or in the form of parameter values for a mathematical conversion function. Due to the average initial velocity of the ions, the relationship between masses and squares of flight times becomes nonlinear. All influences on the average initial velocity, such as fluctuations of laser power, laser focusing, or MALDI preparation, change the relationship between flight time and mass. In order to arrive at a stable method of operation, the objective must be to generate velocity focusing that is so good that dependence on the average initial velocity is eliminated for the most part.

For mass determination, the flight time t must be determined exactly within fractions of a nanosecond. Since a mass signal is available as a peak in the line profile (the sequence of ion current values in time), the centroid of this peak is normally used for exact determination of the flight time. The line profile is measured according to current technology using transient recorders with a least one gigahertz. Generally, the measurements from several spectrum scanning cycles are cumulated before the centroids of the peaks are created.

Departing from the standard definition, flight-time resolution is understood to be the flight-time of ions divided by the full peak width at the foot of the peak (measured in the same time units), and not by the usual full width at half height. The mass resolution has exactly half the value of the time-of-flight resolution because there is essentially a quadratic relation. Since the standard definition of mass resolution relates to the peak width at half height (FWHH=full width at half height), the number values given here for the flight-time resolution are almost identical to those of the mass resolution according to standard convention.

OBJECTIVE OF THE INVENTION

It is the objective of the invention to find operating methods for time-of-flight mass spectrometers which produce a good mass resolution simultaneously in a wide range of the total mass spectrum.

BRIEF DESCRIPTION OF THE INVENTION

In the MALDI process, the heavy ions exhibit a velocity distribution almost equal to those of light ions. Thus they attain greater initial average energies and also especially greater differences in initial energies than the light ions. The different velocities of ions with low and high energy have to be compensated for. It is therefore the basic idea of the invention to feed, by processes in the ion source, the slower heavy ions more energy in comparison to the faster ones, than the slow light ions in comparison to their fast versions.

This can be done by allowing the accelerating field in the first accelerating path to increase in time after the delayed acceleration is switched on. Since the light ions remain only briefly in this accelerating region, the slow light ions only receive slightly more energy than the fast light ions. This is different for the heavy ions. Since the heavy ions remain much longer in this accelerating region, and also the dwell times for faster heavy and slower heavy ions differ considerably, the slower heavy ions receive much more energy than the fast heavy ions.

It is, therefore, the main idea of the invention to let the accelerating field strength in front of the sample support electrode rise in time. Special forms of such temporal increase of the accelerating field strength are linear, square root, or exponential functions of time. By such rises, simultaneous focusing of ions in a wide range of masses throughout the spectrum can be achieved.

DETAILED DESCRIPTION OF THE INVENTION

As mentioned above, it is the main idea of the invention to let the accelerating field strength in front of the sample support electrode dynamically rise in time. Several dynamic rise functions can be applied to achieve the goal of simultaneous focusing in a wide range of masses.

For this purpose, the rise of accelerating voltage $U_1$ between the sample support electrode and the first intermediate electrode for dynamic increase of the field strength may be chosen as a linear increase:

$$U_1=0 \text{ for } t\leqq\tau;\ U_1=V_1+k\times(t-\tau) \text{ for } t>\tau, \quad (1)$$

where τ represents the time lag for the delayed switching on of acceleration, $U_1$ the voltage for the generation of accelerating field strength in the first accelerating path, $V_1$ the pedestal voltage to be switched on (which may also be zero) for the voltage $U_1$ and k is a constant describing the temporal voltage rise; t is the time beginning with the time of the laser light flash.

Simulation calculations reveal however that, in this case, optimum focusing conditions only then occur simultaneously for all masses primarily if there is no delay in acceleration, i.e., τ=0. This case is not favorable for the MALDI ionization since the molecules ionized later in the expanding cloud are no longer subject to optimum focusing. For other methods of ionization, this linear rise is well applicable however.

A rise not constant in time is more favorable, particularly for the MALDI method, than the temporally linear rise of the accelerating field. It is especially favorable if, after delayed switching of the acceleration, the accelerating voltage first rises first quickly and then the rise gets slower and slower. Here the square root function (a parabola with horizontal axis) may be selected, for example:

$$U_1 = V_1 + c_1 \times \sqrt{(t-\tau)} \text{ for } t > \tau, \quad (2)$$

where $c_1$ is a constant for the rise of voltage by a square root of time.

Figure 3:
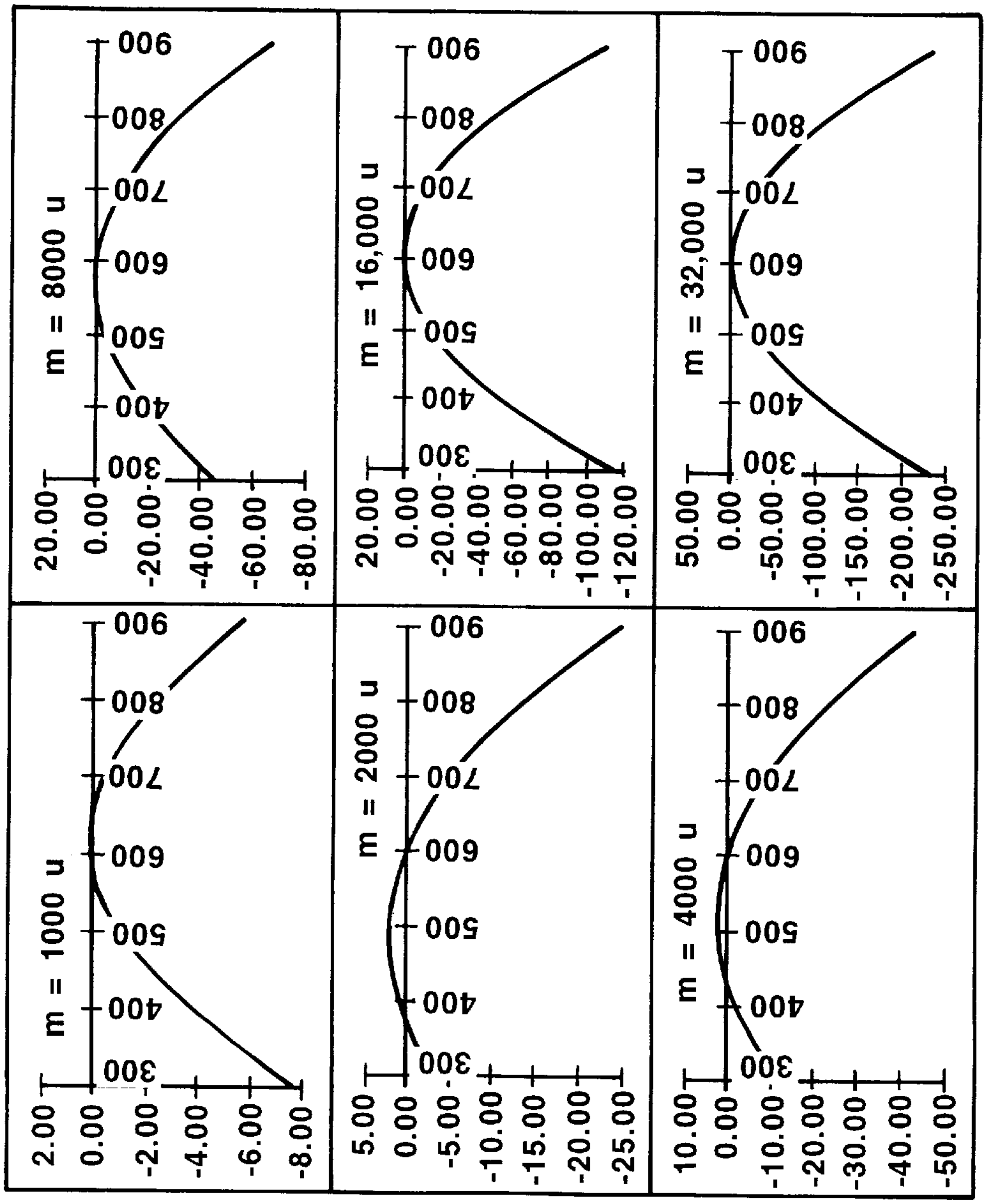
FIG. 3 shows the results of wide-range focusing with a parabolic rise in voltage $U_1$ according to equation (2). The diagram exhibits the time-of-flight deviations (in ppm of flight time, vertical axes), applied to the initial velocities of the ions (in meters per second, horizontal axis) for an optimal parabolic increase. All ion masses in the mass range of m=1,000 amu to m=32,000 amu are focused simultaneously. Focusing is first order everywhere and is attained almost ideally by the ions of all masses at the same time.

FIG. 3 shows the results of simultaneous focusing with such a parabolic rise in voltage $U_1$ according to equation (2). The diagram shows the time-of-flight deviations (in ppm of flight time, vertical axes), applied to the initial velocities of the ions (in meters per second, horizontal axis) for an optimal parabolic increase. All ion masses in the mass range of m=1,000 amu to m=32,000 amu are focused simultaneously. Focusing is first order everywhere and is attained almost ideally by the ions of all masses at the same time. The corresponding time resolutions, electrical and geometric settings are as follows:

TABLE 1

(belonging to focusing results shown in FIG. 3): Results of simultaneous focusing through parabolic change of the first accelerating voltage $U_1$.

| τ = 25.000 ns | Mass [amu] | Time resolution |
|---|---|---|
| $V_1$ = 10.000 kV | 1,000 | 127,268 |
| $c_1$ = 0.7929 kV/s$^{1/2}$ | 2,000 | 37,753 |
| $d_1$ = 11.782 mm | 4,000 | 22,048 |
| $d_2$ = 12.000 mm | 8,000 | 15,273 |
| l = 1.000 m | 16,000 | 8,480 |
| $U_2$ = 20.000 kV | 32,000 | 4,230 |

However, it is electronically simpler to generate an exponential change of the following kind:

$$U_1 = V_1 + W_1 \times \left\{1 - \exp\left(-\frac{t-\tau}{t_1}\right)\right\} \text{ for } t > \tau, \quad (3)$$

where the accelerating voltage $U_1$ begins at the time t=τ with the pedestal voltage $V_1$ and with the time constant $t_1$ approaches the limit value ($V_1$+$W_1$). This course is represented in the time diagram in FIG. 2, and examples with results of focusing with this method are given in FIGS. 4–7. Here even a second order focusing can be generated over a wide range of the spectrum. The pedestal voltage $V_1$ can also be zero.

Figure 2:
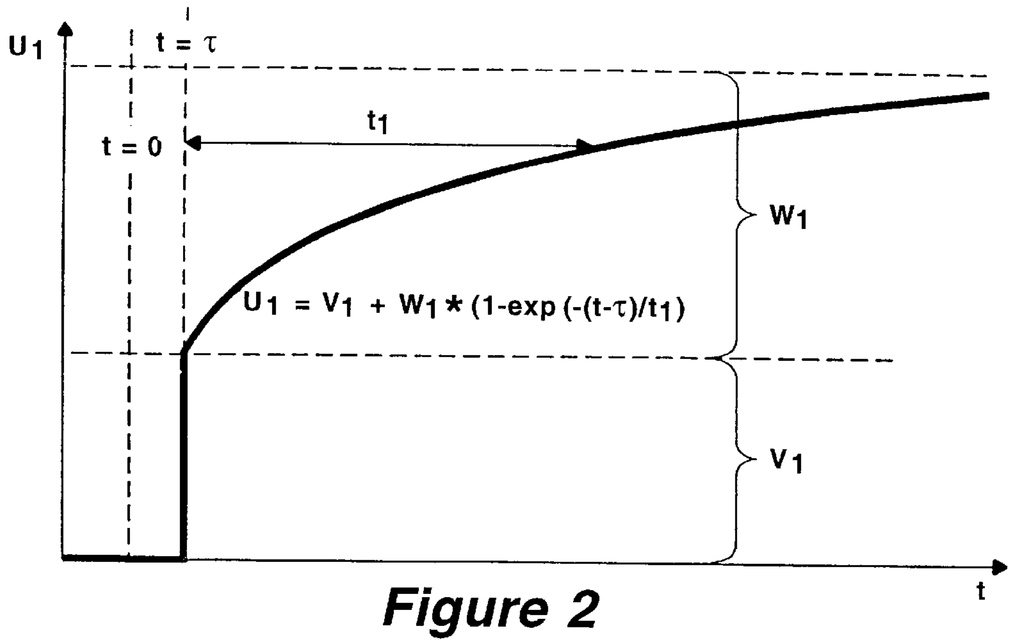
FIG. 2 presents, as an example, the exponential increase function of the accelerating voltage $U_1$. The voltage is switched from zero to the pedestal voltage $V_1$ at the time $t=\tau$ and then approaches exponentially the limit value $V_1+W_1$ with the time constant $t_1$ according to equation (3).

FIG. 2 represents a diagram of exponential change for accelerating voltage $U_1$. The voltage is switched at the time t=τ to the pedestal voltage $V_1$ and then approaches exponentially the limit value $V_1$+$W_1$ with the time constant $t_1$ according to equation (3).

Figure 4:
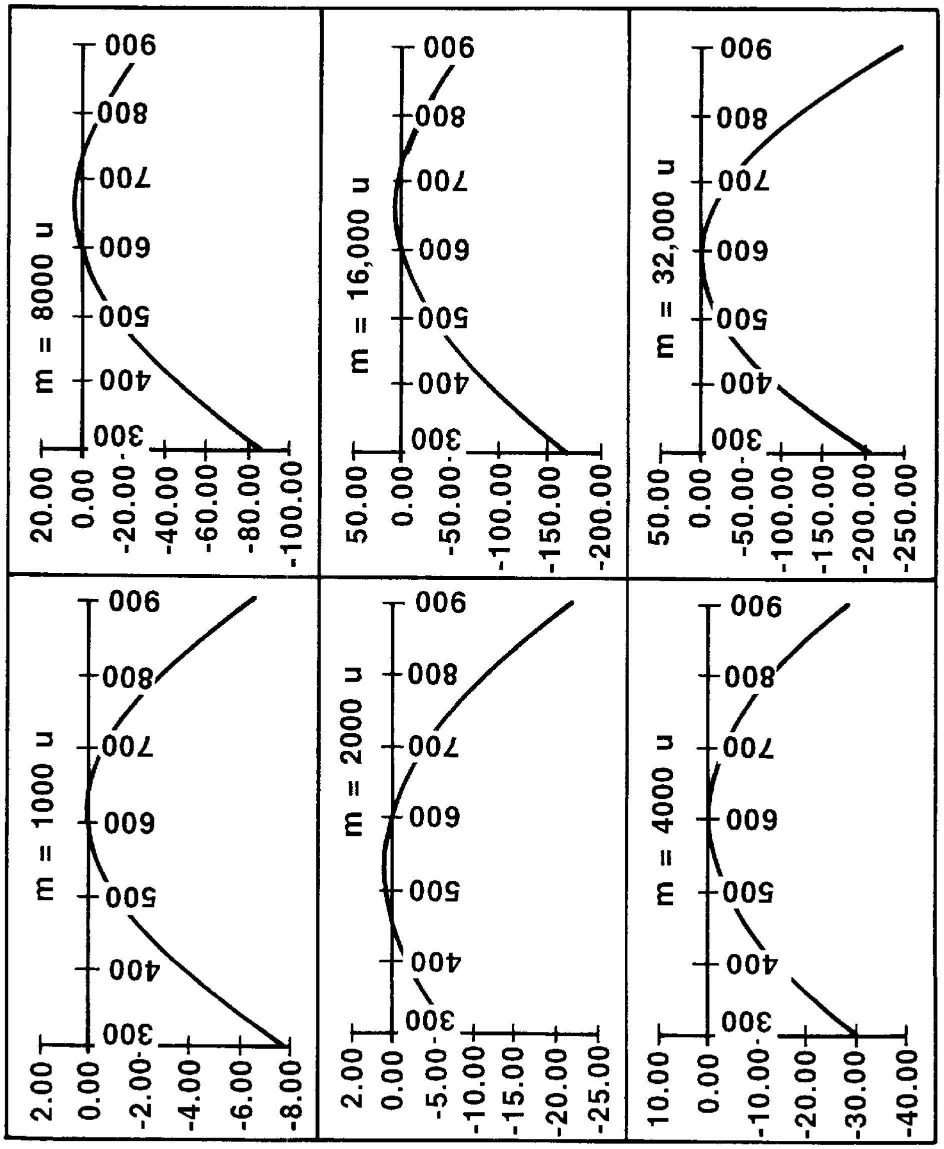
FIG. 4 shows the results of wide-range focusing for an exponential rise in voltage $U_1$ according to equation (3), as presented in FIG. 2. The second accelerating voltage is maintained at the value $U_2=30\ kV-V_1$. The similarity of the results to those in FIG. 3 is obvious.

FIG. 4 shows the results of simultaneous focusing for an exponential rise in voltage $U_1$ according to equation (2). The second accelerating voltage is maintained at the value $U_2$=30 kV−$V_1$. The similarity to FIG. 3 is obvious. The corresponding time resolutions, electrical and geometric settings are as follows:

TABLE 2

(belonging to FIG. 4): Results of simultaneous focusing by exponential rise in voltage U1.

| τ = 25.000 ns | Mass [amu] | Time resolution |
|---|---|---|
| $d_1$ = 12.000 mm | 1,000 | 125,278 |
| $V_1$ = 12.247 kV | 2,000 | 44,680 |
| $W_1$ = 7.921 kV | 4,000 | 35,564 |
| $t_1$ = 2.347 μs | 8,000 | 11,200 |
| $d_2$ = 12.000 mm | 16,000 | 5,833 |
| l = 1.000 m | 32,000 | 4,114 |

Figure 5:
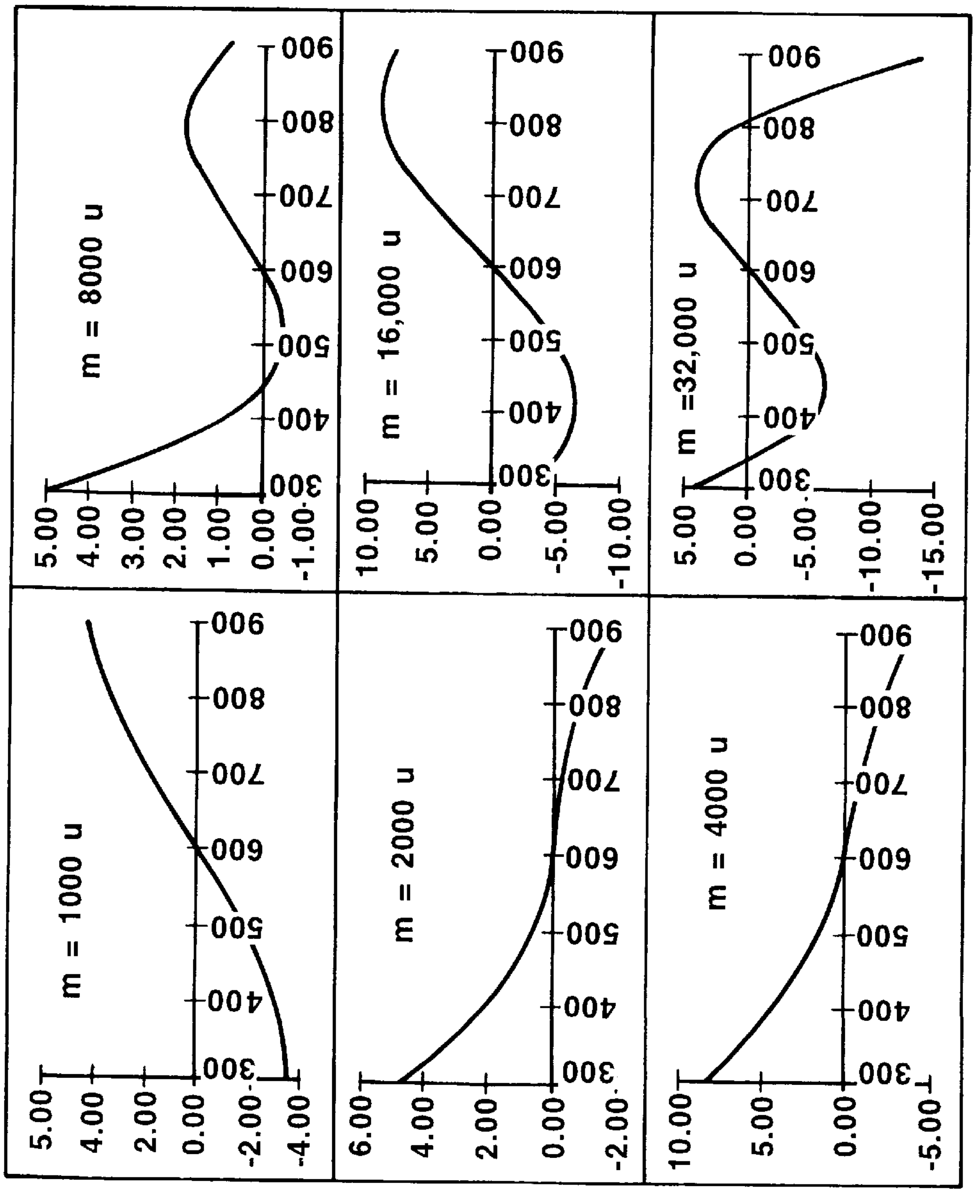
FIG. 5 shows the results of very high time resolutions which are obtained by an optimizing method under free variation of the length $d_1$ of the first accelerating region in case of an exponential rise of the accelerating voltage. The results show that it is possible to obtain (almost) simultaneous second order focusing for all masses in a wide mass range. However, this solution is of limited practical value. The distance $d_1$ of the first acceleration region amounts to 96 millimeters, and the ion cloud expands within the large, open space in front of the sample support in the 17 milliseconds for the optimum time lag $\tau$ to a diameter of about 15 millimeter. This large ion cloud can no longer be satisfactorily focused spatially. Furthermore, the limit potential $V_1+W_1+U_2=73$ kV is much too large for practical applications.

FIG. 5 shows the results of very high time resolutions which are obtained by a mathematical optimization procedure under free variation of the length $d_1$ of the first accelerating region in the case of an exponential rise of the accelerating voltage. The corresponding time resolutions and electrical settings are as follows:

TABLE 3

(belonging to FIG. 5): Ion source for a linear mass spectrometer with second order focus points along the mass scale.

| τ = 16,668 ns | Mass [amu] | Time resolution |
|---|---|---|
| $d_1$ = 96.105 mm | 1,000 | 127,180 |
| $V_1$ = 9.877 kV | 2,000 | 157,067 |
| $W_1$ = 33.200 | 4,000 | 194,412 |
| $t_1$ = 50.769 μs | 8,000 | 186,262 |
| $d_2$ = 12.000 mm | 16,000 | 66,327 |
| l = 1.000 m | 32,000 | 55,832 |

The results show that it is possible to obtain (almost) simultaneous second order focusing for all masses in the entire mass range of interest, with correspondingly high resolution. However, this solution is of limited practical value. The ion cloud expands within the large, open space (96 mm) in front of the sample support in 17 milliseconds to a diameter of about 15 mm. This large ion cloud can no longer be satisfactorily focused spatially. Furthermore, the limit potential $V_1$+$W_1$+$U_2$=73 kV is much too large for practical applications.

Figure 6:
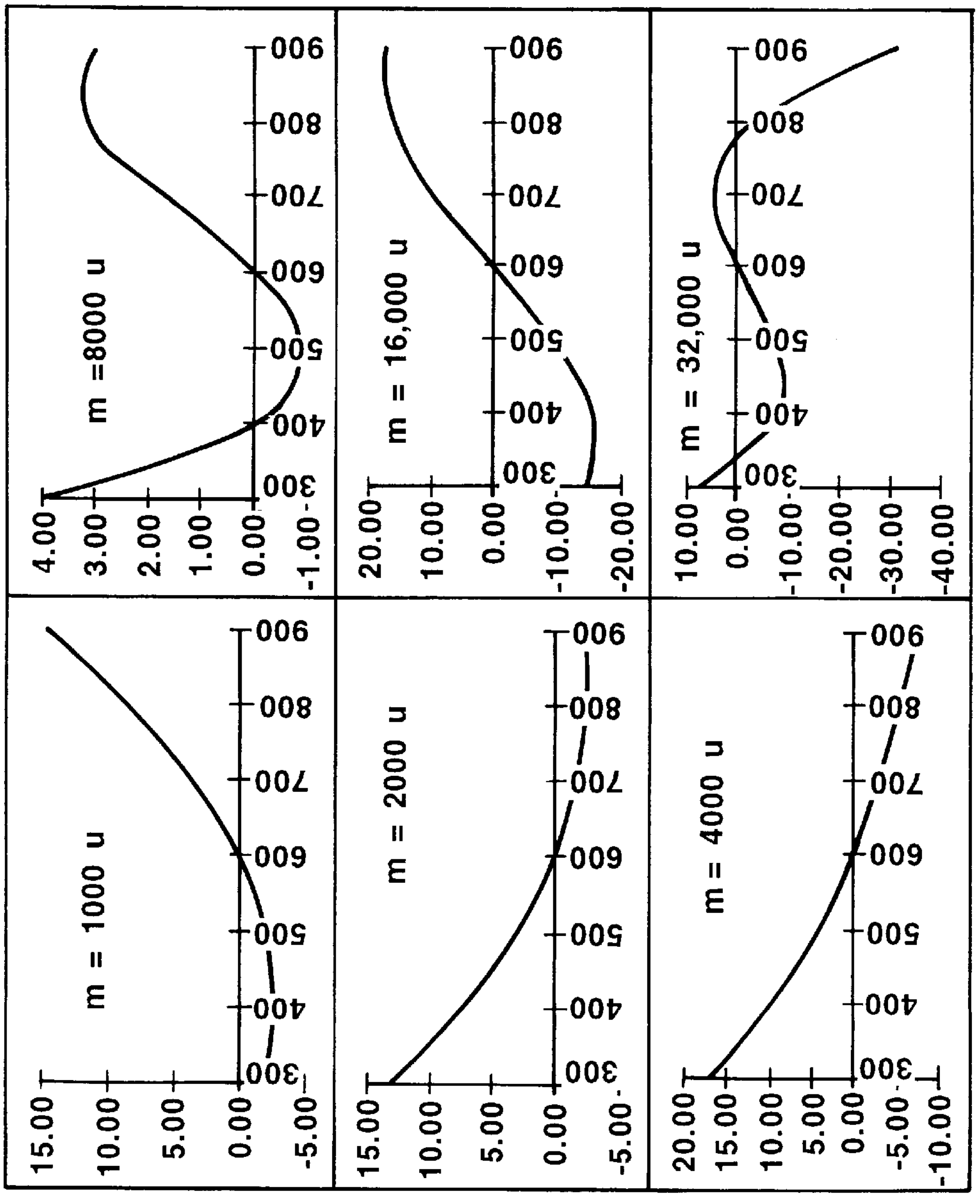
FIG. 6 shows the focusing results of an ion source of practical use which can be used for a time-of-flight mass spectrometer with energy focusing reflector. The focus point is only 35 millimeters away from the base electrode. The focusing is second order over a wide mass range. This focus point can be imaged by the reflector onto the detector, which again results in simultaneous focusing for all masses.

FIG. 6 shows the focusing results of an ion source of practical use which can be used for a time-of-flight mass spectrometer with energy focusing reflector. The focus point is only 35 millimeters away from the base electrode. The focusing is second order over wide mass ranges. This focus point can be imaged by the reflector onto the detector, which again results in simultaneous focusing for all masses.

The corresponding electrical and geometric settings, and the achieved time resolutions are given here:

TABLE 4

(belonging to FIG. 6): Very favorable ion source with operating method for an extremely brief focus for a mass spectrometer with an energy focusing reflector, with second order focus points along one part of the mass scale.

| τ = 385.454 ns | Mass [amu] | Time resolution |
|---|---|---|
| $d_1$ = 3.000 mm | 1,000 | 57,869 |
| $V_1$ = 5.757 kV | 2,000 | 64,036 |
| $W_1$ = 20.000 | 4,000 | 87,010 |
| $t_1$ = 1.261 μs | 8,000 | 202,164 |
| $d_2$ = 12.000 mm | 16,000 | 29,831 |
| l = 0.035 m | 32,000 | 26,331 |

Figure 7:
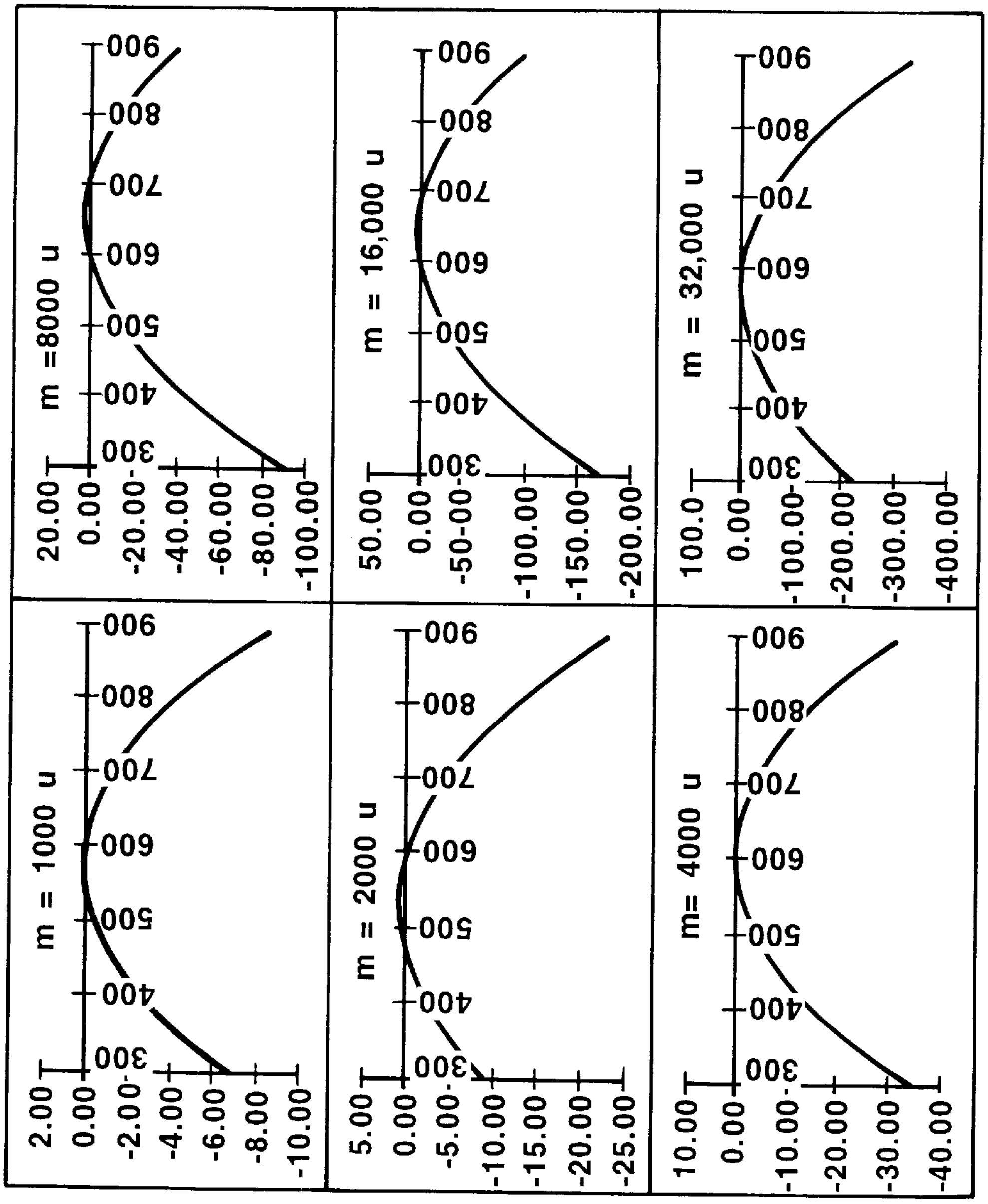
FIG. 7 shows the results of a practical ion source which can be well used with a linear time-of-flight mass spectrometer. Distances $d_1=3$ mm and $d_2=12$ mm correspond to those of commercial mass spectrometers presently in use. Also the voltages do not differ much from voltages used presently, except for their dynamic rise in time.

FIG. 7 shows the results of a practical ion source which can be used well with a linear time-of-flight mass spectrometer. The corresponding time resolutions and electrical settings are as follows:

TABLE 5

(belonging to FIG. 7): Focusing results for a practically usable ion source for a linear time-of-flight mass spectrometer.

| τ = 25.000 ns | Mass [u] | Time resolution |
|---|---|---|
| $d_1$ = 3.000 mm | 1,000 | 118,124 |
| $V_1$ = 2.987 kV | 2,000 | 43,015 |
| $W_1$ = 3.694 | 4,000 | 32,694 |
| $t_1$ = 1.220 μs | 8,000 | 10,380 |
| $d_2$ = 12.000 mm | 16,000 | 5,552 |
| l = 1.000 m | 32,000 | 3,046 |

The ion source is identical to the ion source for a reflector time-of-flight mass spectrometer, the results of which are shown in FIG. 6.

The ion cloud expands in the 25 nanoseconds of time lag to a diameter of only about 20 micrometers and is therefore excellent for focusing spatially. The voltages $V_1$ and $W_1$ are very moderate and easy to handle; even the time constant, at 1.22 microseconds, is in a favorable range. The second accelerating voltage is again kept constant at the value $U_2$=30 kV−$V_1$.

The resolutions are not extraordinary in the range 16,000 amu to 32,000 amu, but good enough for most practical purposes. For every mass, they attain about ⅔ of the resolution which can be adjusted optimally for just this mass using the method of delayed acceleration without further voltage changes. This figure must be compared with the results which can be achieved without this invention, presented in FIG. 8.

Figure 8:
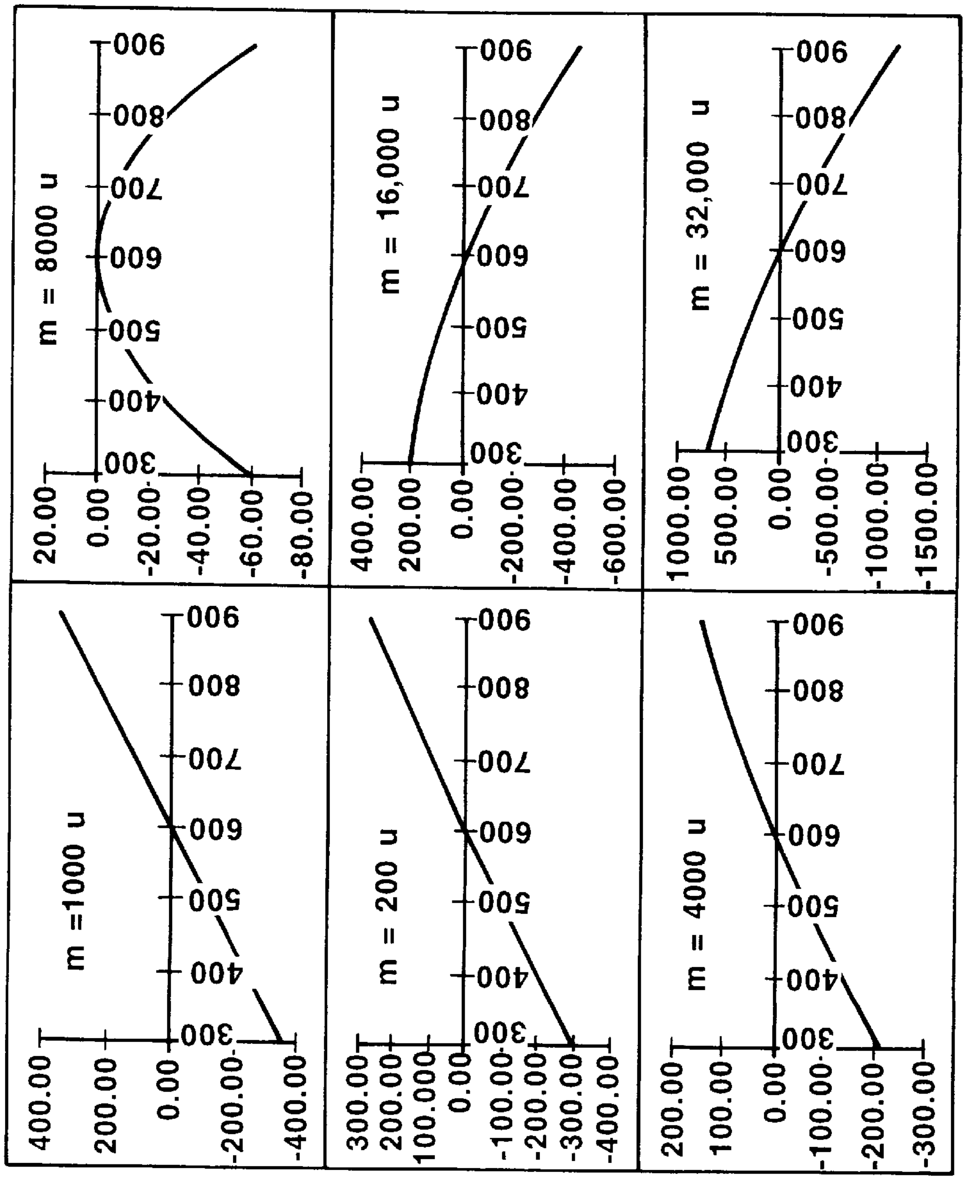
FIG. 8 shows the simultaneously achievable time resolution for all masses by the method of delayed acceleration without application of this invention. The same linear mass spectrometer according to FIG. 7 was selected, and the mass 8,000 amu was optimally focused. It is apparent that only one single mass can be focused at a time; there is no focusing for the remaining masses.

FIG. 8 shows the simultaneously achievable time resolutions for all masses obtained by the method of delayed acceleration without application of this invention. The same linear mass spectrometer according to FIG. 7 was selected, and the mass 8,000 amu was optimally focused. It is apparent that only one single mass can be focused at a time; there is no focusing for the remaining masses.

TABLE 6

(belongs to FIG. 8): For comparison, the simultaneously achievable time resolutions without application of this invention are shown here; the same ion source according to FIG. 7 was used, and the optimum focusing for linear time-of-flight mass spectrometers was set to the mass 8,000 amu.

| | Mass [amu] | Time resolution |
|---|---|---|
| τ = 30.000 ns | 1,000 | 1,440 |
| $d_1$ = 3.000 mm | 2,000 | 1,746 |
| $U_1$ = 9.316 kV | 4,000 | 4.611 |
| $d_2$ = 12.000 mm | 8,000 | 16,483 |
| l = 1.000 m | 16,000 | 1,526 |
| | 32,000 | 536 |

Figure 9:
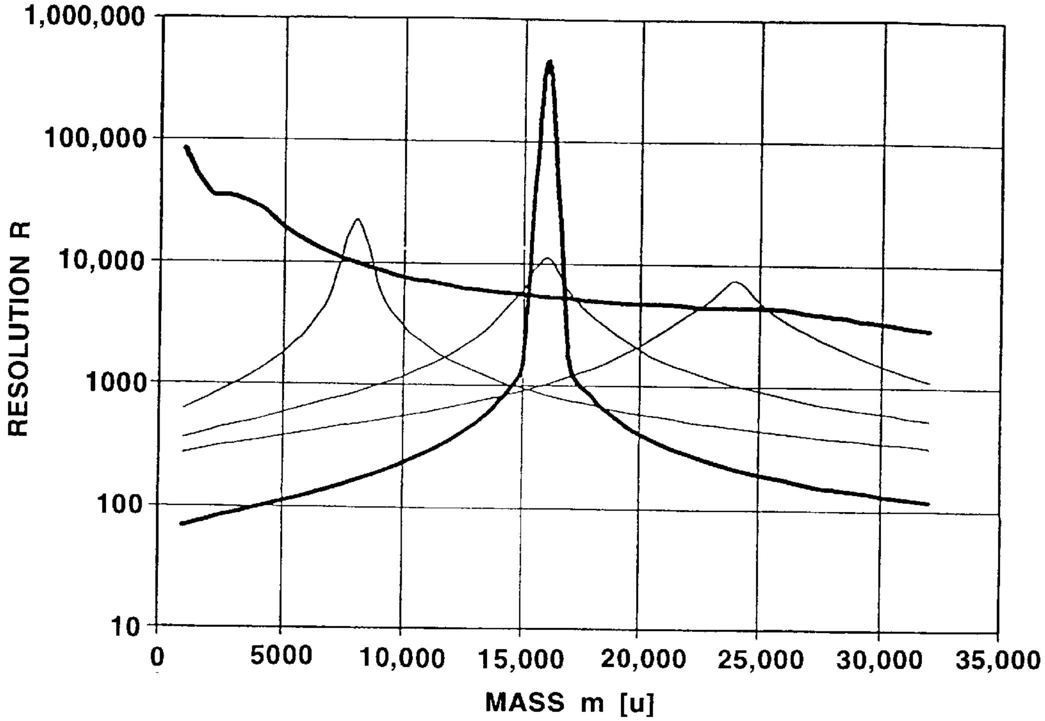
FIG. 9 presents a diagram which shows the theoretically achievable resolutions of different methods over the mass range.—The three thinly drawn curves represent the resolutions of the well-known delayed acceleration method ("delayed extraction") without further temporal change of the voltages, optimized for 3 different masses (8,000 amu, 16,000 amu and 24,000 amu). The curves show that an optimization is only possible in small mass ranges.—The thickly drawn, flat, slightly declining curve shows the result of this invention. Focusing is good for all masses; it lies only slightly below the results of the best optimization through normally delayed initiation of acceleration.—The thickly drawn curve with a strongly excessive peak at 16,000 amu shows the "magnifier glass mode" for isotope patterns according to the invention in BFA 45/96.

FIG. 9 presents a diagram which shows the courses of theoretically achievable resolutions of different methods over the mass range.—The three thinly drawn curves represent the resolutions of the known delayed acceleration method ("delayed extraction") without further temporal change of the voltages, optimized for 3 different masses (8,000 amu, 16,000 amu and 24,000 amu). The curves show that an optimization is only possible in small mass ranges.—The thickly drawn, flat, declining curve shows the result of this invention. Focusing is good for all masses; it lies only slightly above the results of the best optimization through normally delayed initiation of acceleration.—The thickly drawn curve with a strongly excessive peak at 16,000 amu shows the "magnifier glass mode" for isotope patterns according to the invention in BFA 45/96.

All results were achieved through computer simulations with the same ion source. The geometric dimensions of this ion source correspond to those of a commercially operated ion source from the applicant.

In order to obtain focusing of the ions of all masses simultaneously it is also possible to change the second accelerating field in time. A special case is the reverse change of voltages for the first and second accelerating field, so that the sum of the accelerating voltages remains constant. This reverse change can very easily be achieved by changing the potential of the intermediate electrode, instead of changing the potential of the sample support electrode. This case leads to similar results as those given above in the case of change of $U_1$ alone, however it has the slight advantage that the non-linear relationship between the mass and square of the flight time is somewhat straighter, i.e. less strongly curved.

The characterization of the orders of focusing is given in the quoted patent application.

PARTICULARYLY FAVORABLE EMBODIMENTS

Figure 1:
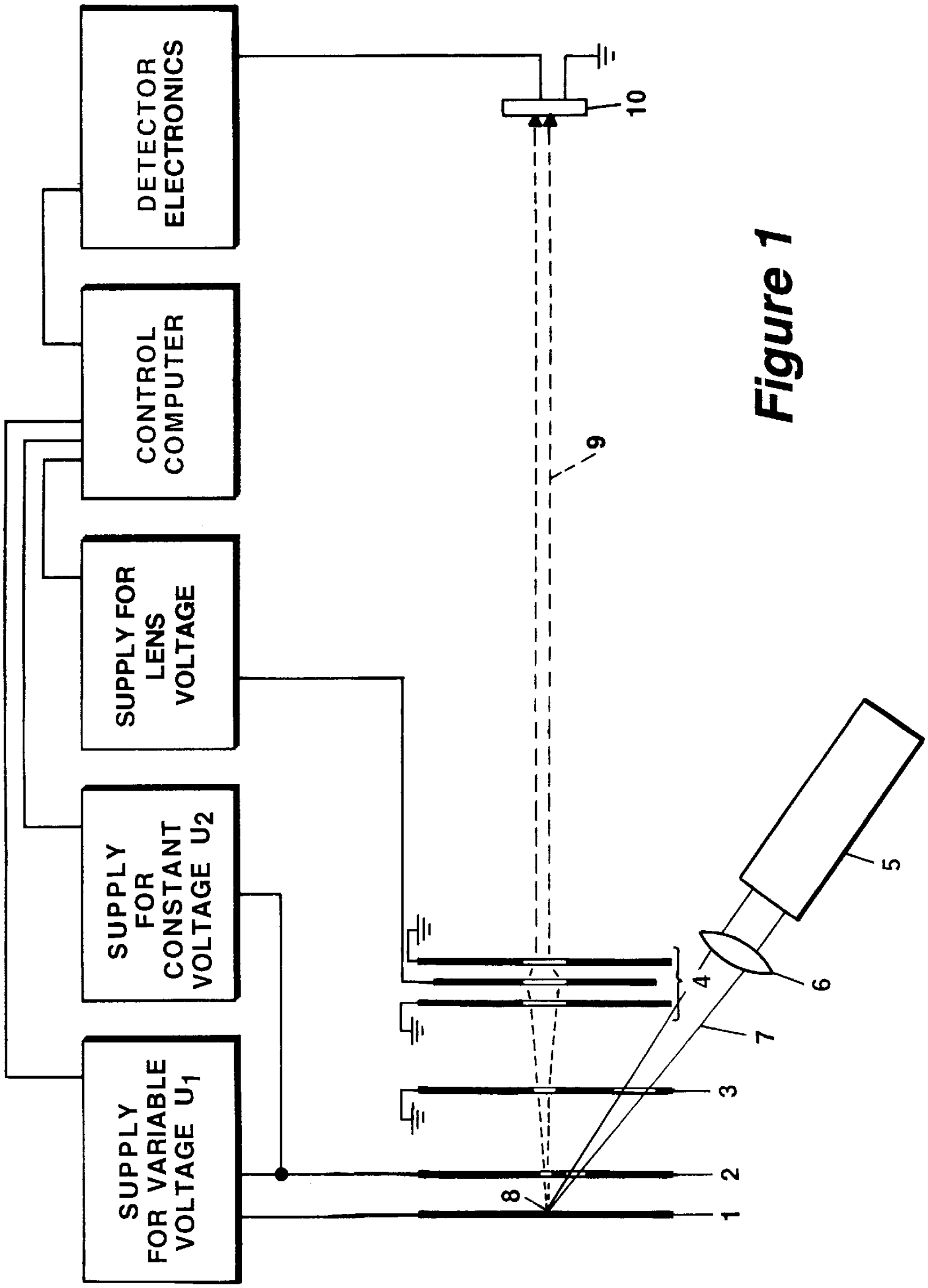
FIG. 1 shows the principle design of a time-of-flight mass spectrometer with its schematically indicated supply units. Sample support electrode 1 is at the accelerating potential $P_1=U_1+U_2$ and the intermediate electrode 2 is at the potential $P_2=U_2$.

FIG. 1 shows the principle design of a time-of-flight mass spectrometer with its schematically indicated supply units. Sample support electrode 1 is at the accelerating potential $P_{1=U1}$+$U_2$ and the intermediate electrode 2 is at the potential $P_2$=$U_2$.

The accelerating voltage $U_1$ between sample support 1 and intermediate diaphragm 2 is switchable and dynamically changeable. A light flash from laser 5 is focused by lens 6 into a convergent light beam 7 onto sample 8, which is on sample support 1. At this time, the accelerating voltage has the value $U_1$=0. The light flash generates ions from the analysis substance in a MALDI process with an average initial velocity v=600 meters per second and a large velocity spread. After a time lag τ, the accelerating voltage $U_1$ is switched to the initial value $V_1$, whereupon it approaches exponentially the limit value ($V_1$+$W_1$) with a time constant $t_1$. As of the time t=τ, the ions are accelerated. They form beam 9 of the ion current which is measured by time resolution by detector 10 after passing through the field-free flight path between base electrode 3 and detector 10.

The arrangement shown here has gridless diaphragms as an intermediate electrode 2 and base electrode 3 and therefore requires Einzel lens 4 for parallelism of the ion stream 9. If grids are introduced into intermediate electrode 2 and base electrode 3, there is usually no Einzel lens 4, although the intermediate grids reduce the achievable resolution due to their unavoidable small-angle spread, and the beam divergence is not eliminated due to the lateral initial velocities.

A design for a linear time-of-flight mass spectrometer with simultaneous high resolution for all masses according to this invention is shown in principle in FIG. 1. This mass spectrometer is the same in principle as many other, even currently available commercial time-of-flight spectrometers. The only special feature lies in the control of the dynamic behavior of the voltages or potentials. Sample support 1 and intermediate electrode 2 have a relatively small distance $d_1$ from one another, as it is the case for the results shown in FIG. 7. The switchable field therefore does not need any homogenization electrodes. Also the somewhat longer distance $d_2$ between intermediate electrode 2 and base electrode 3 still does not require homogenization of the field via homogenization electrodes. In this way, a mechanically very simple ion source is the result.

When using the delayed dynamic acceleration described above, sample support 1 and intermediate electrode 2 are first at the potential $P_1=P_2=U_2$. The voltage supply unit is triggered by the ionizing laser flash, and the potential of the sample support electrode is switched up, after time lag $\tau$, to the potential $P_1=(V_1+U_2)$, and then temporally changed in accordance with the function in equation (3), so that it approaches the limit value $P_{1.limit}=(V_1+W_1+U_2)$ asymptotically. Such a temporal change can be generated relatively easily using capacitors and resistors if basic voltages are available for both pedestal and limiting voltage.

However, it is also possible to generate this changeable field strength for the first accelerating path in a different way. For example, the potentials from sample support $P_1$ and intermediate electrode $P_2$ may both be at the higher potential $P_1=P_2=(V_1+U_2)$ at the start. After the time lag $\tau$, the potential of the intermediate electrode $P_2$ is switched down to the value $P_2=U_2$ and the change of potential $P_1$ sample support is started at the same time (or after a second delay time) in accordance with the function $P_1(t)=V_1+U_2+W_1\times[1-\exp\{-(t-\tau)/t_1\}]$. This operating method separates the switchable potential from the temporally changeable potential, however it starts the switching and changing at the same point in time through the same electronic delay element.

If the time lag $\tau$, the time constant $t_1$ and the voltages $U_1$, $V_1$, $W_1$ and $U_2$ are correctly selected, one attains for all masses of the spectrum simultaneously a good resolution through first order focusing as shown in the focusing results in FIGS. 4 and 7. If one adds a correct selection of distances $d_1$ and $d_2$, and the flight lengths l up to the focus point, even a second order focusing is attainable over the entire mass range or at least over large parts of the same, as can been seen from the results in FIGS. 5 and 6. In this way, not only the greatest mass resolution is provided in this range, but, by obtaining narrow mass peaks, also an especially good ratio of the signal to the background noise and therefore an especially deep detection limit In practice, any time-of-flight mass spectrometer can be improved with respect to wide-range focusing, if only the voltage supplies are exchanged by supplies able to deliver dynamically varying voltages. By varying the time constants $\tau$ and $t_1$, and the voltages $V_1$ and $W_1$, the best conditions for wide-range focusing can be easily found.

Once an acceptable solution for the analytical problems on hand has been found and selected for the design, consisting of a set of values for the electric and geometric parameters, nothing more need ever to be changed for such a mass spectrometer. Slight refocusing, which may become necessary through aging of the electronic components, may easily be done via control of one of the voltages. The solution found also turn out to be amazingly insensitive to small changes of most parameters, for example the time lag $\tau$.

With this invention, it becomes possible for the first time to construct a "pushbutton machine", for the operation of which no sample-specific settings must be made by the operator. A completely automatic measuring operation can thereby be set up which requires no previous knowledge regarding the samples, and nevertheless provides mass determinations of high precision ($<1/10{,}000$). Yet only smallest amounts of sample are used for analysis.

Furthermore, on the same machine, it is also possible using corresponding electronic equipment to switch on a "magnifying mode" which shows any selectable mass signal with very high mass resolution according to the invention described in BFA 45/96, so that the isotope structure becomes visible and mass determinations of extreme accuracy ($<1/1{,}000{,}000$) may be carried out.

However, the invention is not only useful for linear time-of-flight mass spectrometers. As the focusing results represented in FIG. 6 show, an ion source with very short focus distance and excellent wide range time resolution can be built. This ion source can be excellently used for a mass spectrometer with energy focusing reflector. The results of simulations show that with such a reflector mass spectrometer, the iosotope pattern of large molecules can be resolved almost over the entire mass range up to a mass of 32,000 u. This can be done if the reflector refocuses the ions of different velocities sufficiently well and the MALDI process fulfills the prerequisite of correlation between space and velocity distribution. If these prerequisites are fulfilled, a time-of-flight mass spectrometer with reflector can therefore be built as an automatically working "pushbutton machine" for the operation of which no sample-specific settings need to be made by the operator, and which resolves the isotope structures for all masses up into the 32,000 amu mass range.

In the intermediate focus of such a mass spectrometer, one can then additionally and without negative consequences influence the ions with actions which result in slight velocity changes. These are then completely refocused again by the reflector. These actions can for example be collisions with molecules or photons for fragmentation, or also spatial focusing through Einzel lenses which may also cause slight velocity changes in the flight direction.

Since a favorable ion source (FIG. 6) for the reflector mass spectrometer and a favorable ion source (FIG. 7) for a linear time-of-flight mass spectrometer may be geometrically completely identical, one can also operate the reflector mass spectrometer through pure electrical switching in the linear operating mode, in which no ghost signals occur due to fragment ions. In the reflecting operating mode, daughter ions from the MALDI process (or from a built-in collision cell) may then also be analyzed in the standard fashion. For both operating modes—linear and reflecting—the "magnifying mode" may also be switched on with extreme resolution for a selected mass.

Depending on the analytical task for the mass spectrometer, it may not even be optimal to have the highest resolution achievable by this method for any mass in the spectrum. It may well be worthwhile to have a good separation of the isotopic mass peaks up to a certain mass, e. g., up to mass 4,000 amu, requiring a mass resolution of R=8000 at this mass. Above that, the resolution may drop down to show single peaks with not isotopic structure for peaks of ions of one molecular species. But these must be well resolved from ion species, which show a loss of a water molecule (loss of 18 atomic mass units), or which show an adduction of Sodium or Potassium atoms (increase by 23 or 41 atomic mass units, respectively). The required resolution of about 10 atomic mass units absolute must then reach from mass 3,000 amu up to mass 30,000 amu in the spectrum, requiring the mass resolution rising again from R=600 to R=6000 in this range.

Such a course of the mass resolution along the mass spectrum can be obtained by tailored rise functions. The easiest way for the above task is to introduce a second delay time $\tau_2$ between start of the delayed acceleration with constant field strength and begin of the dynamic rise of the acceleration field.

With time-of-flight mass spectrometers operated according to this invention, spectra of the analyte substances can be acquired as usual. The spectrum measurement begins with ionization of the sample substances 8 on the sample support 1, as described here in the MALDI method of ionization. The ions are generated by a light flash of about 3 to 5 nanoseconds duration from laser 5. Usually, UV light has a wavelength of 337 nanometers if used from a moderately priced nitrogen laser. The light flash is focused through lens 6 as a convergent light beam 7 onto sample 8 on the surface of the sample support 1. The ions formed in the vapor cloud, generated by the laser focus, are first, after time lag $\tau$, accelerated in the changeable electric field of length $d_1$ between sample support 1 and intermediate electrode 2, the slower ions receiving more energy than the fast ions. Together with the postacceleration in the second electrical field between intermediate electrode 2 and base electrode 3, this differing energy feed leads to the desired focusing.

The ion beam is always slightly divergent due to the lateral velocity components and is additionally slightly focused in the gridless electrode arrangement. For this reason, it is focused at the start of the flight path in the Einzel lens 4 onto detector 10. The flying ions from the ion beam form an ion current 9 with temporally strong variation, which is measured at the end of the flight path by ion detector 10 with high temporal resolution.

The ion sources indicated here are not equally optimal for all analytical tasks. Thus the extension of length $d_1$ of the first accelerating region between sample support and intermediate electrode from 3 mm to larger values increases the resolution for high masses (16,000 amu to 32,000 amu) at the expense of resolutions in the lower mass range, although the expansion of the ion cloud before acceleration increases.

The operating modes indicated here are also not the only ones which are successful. Thus, the field strengths may be varied temporally in more than one accelerating path. A particularly favorable case is the reverse change already mentioned in the first and second accelerating field, which can be achieved by temporal change of the potential $P_2$ of the intermediate diaphragm. The result is similar, partially even somewhat better results than have already been represented for the case of change of $P_1$ alone, although the relationship between mass and square of the flight time is much straighter.

The results of the invention presented here provide simultaneous resolutions for all masses which attain about ⅔ of the resolution, which can be obtained optimally for one single ion mass each through the method of delayed initiation of acceleration without further change in voltage. This applies within the scope of the geometric ratios indicated. It must however be expected that for further analyses, especially with temporal change of more than one accelerating field, even more favorable results can be achieved.

The time-variable ion current provided by the ion beam is usually measured and digitalized at the detector with a scanning rate of one or two gigahertz. Transient recorders at an even higher temporal resolution will soon be available. Usually, concurrent measured values for several spectrum scans are cumulated before the mass peaks in the stored data are sought by peak recognition algorithms, and transformed from the time scale into mass values via the mass callibration curve.

The polarity of the high voltage used for the ion acceleration must be the same as the polarity as the ions being analyzed: Positive ions are repelled and accelerated by a positively charged sample support, negative ions by a negatively charged sample support.

Of course, the time-of-flight mass spectrometer can also be operated in such a way that the flight path is in a tube (not shown in FIG. 1), which is at accelerating potential $V_1+U_2$, while the sample 1 is at ground potential. In this special case, the flight tube is at a positive potential if negatively charged ions are to be analyzed, and vice versa This operation simplifies the design of the ion source, since the isolators for the holder of the exchangeable sample support 1 are no longer necessary. In this case it is favorable to switch and vary the potential of the intermediate electrode.

Since the same operating conditions always prevail during application of this invention, one may also work with a single calibrated conversion relationship for the flight times into the masses. This determination of mass from the flight time, which always remains constant, allows to streamline the algorithms and helps in case of extremely high sample throughput.

In the description of this invention, the MALDI method for ionization of substances on the sample support was assumed. However, similar conditions also result for other methods of ionization of substances which are applied to a surface. Examples of this are secondary ion mass spectrometery (SIMS), normal laser desorption (LD) or so-called plasma desorption (PD), which is obtained by high-energy fission products on thin films. Although the MALDI method was focused on, the invention is not limited to this method but relates to all methods by which ions are generated which have a spread of initial velocities even if it is generally not as large as for the MALDI process.

What is claimed is:

1. Measurement method for mass spectra of an analyte substance in a time-of-flight mass spectrometer having a sample support electrode and a subsequent electrode, the method comprising the steps of (a) pulse ionizing molecules of the analyte substance that are proximate to the sample support electrode, (b) waiting a predetermined delay time $\tau$ following the ionizing, (c) generating, after the delay time $\tau$, an acceleration field that extends from the sample support electrode to the subsequent electrode, the acceleration field having an initial field strength, and (d) increasing the strength of the acceleration field according to a predetermined continuous function of time so as to focus ions of the analyte substance in wide ranges of mass-to-charge ratios.

2. Method according to claim 1, wherein matrix-assisted laser desorption and ionization (MALDI) is used for the pulse ionizing step (a).

3. Method according to claim 1, wherein the predetermined function is linear in time.

4. Method according to claim 1, wherein the predetermined function follows the function $U_1(t)=V_1+c_1\times\sqrt{(t-\tau_1)}$ over time t, wherein $V_1$ is an initial voltage on the sample support electrode relative to a voltage on the subsequent electrode that establishes the initial field strength, $c_1$ is an adjustable constant and $\tau_t$ is a total delay between ion generation and start of the predetermined function.

5. Method according to claim 1, wherein the predetermined function follows the exponential function $$U_1(t)=V_1+W_1\times\left\{1-\exp\left(-\frac{t-\tau_t}{t_1}\right)\right\},$$

where $(V_1+W_1)$ is a limit value for the accelerating voltage being approached asymptotically, $t_1$ an adjustable time constant, and $\tau_t$ is a total delay between ion generation and start of the predetermined function.

6. Method according to claim 1, wherein the mass spectrum of the ions is measured with a linear time-of-flight mass spectrometer.

7. Method according to claim 1, wherein the mass spectrum of the ions is measured with a time-of-flight mass spectrometer with ion reflector.

8. Method according to claim 7, wherein the time-of-flight mass spectrometer with ion reflector may be operated as a linear mass spectrometer as well, whereby the voltages of the reflector are switched off, voltages and rise functions are changed, and a detector is used behind the reflector.

9. Method according to claim 1, wherein, by intermediately switching over the operating method to a declining accelerating field strength, an extremely high resolution is generated, which is adjustable by changing the time lag $\tau$ and/or the sample support voltage $V_1$ to any selected mass in the spectrum.

10. Method according to claim 1, wherein the acceleration field is a first acceleration field and wherein the method further comprises changing the field strength of at least one additional accelerating field according to a predetermined continuous function.

11. Method according to claim 1 wherein the predetermined function is implemented at least in part by changing a voltage on the sample support.

12. Method according to claim 1 wherein the predetermined function is implemented at least in part by changing a voltage on the subsequent electrode.

13. Method according to claim 1 further comprising waiting a predetermined second delay time $\tau_2$ after generating the acceleration field before increasing the strength of the acceleration field.

* * * * *